United States Patent [19]

Schäfer et al.

[11] Patent Number: 5,470,199
[45] Date of Patent: Nov. 28, 1995

[54] ADJUSTMENT DEVICE FOR PROPELLER PUMPS

[75] Inventors: Horst Schäfer, Rhade; Günter Schaaf, Bremen, both of Germany

[73] Assignee: KSB Aktiengesellschaft, Frankenthal, Germany

[21] Appl. No.: 200,236

[22] Filed: Feb. 23, 1994

[30] Foreign Application Priority Data

Feb. 27, 1993 [DE] Germany .......................... 43 06 141.9

[51] Int. Cl.⁶ ........................................... F03B 3/06
[52] U.S. Cl. .......................... 415/129; 416/155; 416/160
[58] Field of Search .......................... 415/129; 416/155, 416/160, 162, 159

[56] References Cited

U.S. PATENT DOCUMENTS

| | | | |
|---|---|---|---|
| 1,716,134 | 6/1929 | Huguenin | 416/155 |
| 2,370,675 | 3/1945 | McCoy | 416/160 |
| 2,446,658 | 8/1948 | Maynard | 416/155 |
| 2,487,836 | 11/1949 | Turnbull | 416/155 |
| 4,527,072 | 7/1985 | Van Degeer | 416/160 |
| 4,534,524 | 8/1985 | Aldrich | 416/160 |
| 4,591,313 | 5/1986 | Miyatake et al. | 416/155 |
| 4,660,437 | 4/1987 | Scott | 416/160 |
| 5,156,648 | 10/1992 | Hora . | |

FOREIGN PATENT DOCUMENTS

| | | |
|---|---|---|
| 1324947 | 2/1962 | France . |
| 9108919 | 6/1991 | France . |
| 473599 | 2/1929 | Germany . |
| 2250473 | 10/1972 | Germany . |
| 3426967 | 7/1984 | Germany . |
| 3426967C2 | 7/1984 | Germany . |
| 3620879 | 6/1986 | Germany . |
| 8706386 | 5/1987 | Germany . |
| 59-176498 | 5/1984 | Japan . |
| 299479 | 8/1954 | Switzerland . |

OTHER PUBLICATIONS

Patent Abstracts of Japan vol. 9, No. 34 (M–357)(1757) 14. Feb. 1985 JP-A 59 176 498 9EBARA Seisakusho K.K.) 5 Oct. 1984.

Storek, H.: Neuere Konstrucktfonen kleinerer und mittelgro 1er Kaplanturbinen. In: Engergie, Jg. 5, Nr. 8 15 Aug. 1953, S.232–234.

*Primary Examiner*—Edward K. Look
*Assistant Examiner*—Mark Sgantzos
*Attorney, Agent, or Firm*—Darby & Darby

[57] ABSTRACT

The invention relates to an adjustment device for variable-pitch propellers or turbo-engines. A drivable rotor is mounted on a hollow flange of a shaft that is connected to the variable-pitch propeller. The rotor is rotatably mounted on the hollow flange, and its inside diameter has a formation which interacts with intermediate wheels and gears mounted in the hollow flange.

6 Claims, 5 Drawing Sheets

5,470,199

ADJUSTMENT DEVICE FOR PROPELLER PUMPS

FIELD OF THE INVENTION

The present invention relates generally to an adjustment device for variable pitch propellers of turbo-engines.

BACKGROUND OF THE INVENTION

An adjustment device is shown, for example, in DE-PS 34 26 967. This patent discloses a shaft having a center bore, such that the spindle of an adjustment mechanism for the variable-pitch propeller is disposed within the bore. At its end that is remote from the pump, the shaft itself has a coupling for introducing the torque. The flange of the multi-part shaft is designed hollow, and its floor area contains a step-down gear transmission as well as a bearing for gear wheels which introduce a force. The force is conducted to the step-down gear transmission within the hollow flange through various axial planes. The torque of the adjustment mechanism is generated in a very complicated fashion by an external electric motor with the intermediate connection of an external differential gear. This type of construction disadvantageously requires a large amount of space.

Another example of an adjustment device is disclosed in JP-A 59-176 498 which includes an adjustment mechanism in which a rotor of an electric motor is mounted in the area of a shaft end along with an intermediate connection of a spindle nut and of a slide piece on the shaft end. During operation, the rotor is moved axially relative to the shaft, and an axial thrust force is generated, which, through a yoke within a hollow flange, transmits an axial motion to an adjustment spindle. Since the rotor must execute its axial motion within its stator, an over-proportionally long stator is required which results in an uneconomical operating behavior. In addition, this proposed solution is very complicated and quite prone to malfunction.

SUMMARY OF THE INVENTION

The present invention is based on overcoming the aforementioned problems and for developing an adjustment device which can be integrated into a shaft end. The present invention includes an annular rotor mounted on a hollow flange, such that the side of the rotor which faces the rotation axis has a torque-transmitting formation and is connected to the gear transmission inside the hollow flange so as to transmit forces, and the rotor is driven by a motor.

This mode of construction makes possible a very compact structure and has a wide range of applications. Thus, various types of gear transmissions can be integrated into the hollow flange and the drive concept for the rotor can also be varied in many ways.

For this purpose, a modification of the present invention provides that the rotor be designed as the rotor of an electric motor. By mounting the rotor directly on the hollow flange, the diameter is greatly reduced. The stator of the electric motor itself can be disposed in the stationary part of the turbo-engine, for example, in a submersible motor-driven pump unit, in a side opening of a tubular-type pump or turbine, in a bearing housing of the shaft, or the like.

This solution represents an optimum use of space in accordance with the structure of the associated machine. However, for applications, in which the use of commercial parts that are available in large numbers on the market is to be given preference, a further modification of the present invention provides that the rotor side which points away from the rotation axis has a formation which guarantees the engagement of the gear transmission elements and that the rotor is driven by an electric motor through the intermediacy of gear-transmission elements.

The outer circumferential side of the rotor thus can have various forms to engage gear-transmission parts. Teeth for gear wheels, toothed belts and chains are possible as well as are appropriate formations to engage drive belts, switching systems, or other known transmission systems. So-called standard motors can be used as the driving motor. As an additional advantage, the rpm ratios and the desired torque can be influenced favorably through the intermediacy of a gear wheel transmission disposed between the motor and the rotor. Should the space requirement become slightly greater, this can be compensated by an appropriate arrangement of the motor in areas of the turbo-engine in which sufficient free space is available. However, the use of standardized parts represents a considerable advantage in terms of storage and ease of servicing.

Another modification of the present invention provides that one or more intermediate wheels are rotatably mounted in recesses of the hollow flange. The wall surface which forms the circumferential surface of the hollow flange has one or more intermediate wheels at appropriately designed bearing points to transmit the torque, that is necessary for an adjustment, to the gear transmission that is disposed within the hollow flange. The intermediate wheels can be gear wheels, friction wheels, cam disks, or other appropriate wheels, in accordance with the type of gear transmission that is used within the hollow flange. It is also possible to let the rotor with the intermediate wheels act directly on an adjustment spindle without additional gears. The rotor or its drive can also have the capacity of reversing its direction of rotation.

The motor can be designed in various ways. However, it must be possible to brake the motor during operation. Also, the motor must have a greater rotational speed than the shaft, relative to the same direction of rotation. These measures make it possible for the adjustment spindle to move relative to the shaft and thus to perform its adjustment function.

Another possibility provides for a drive which has at least two rotational speeds, which are faster or slower relative to the rotational speed of the pump shaft. This, too, can create a relative motion of the spindle to activate the mechanism for adjusting the blades.

In the case where a drive with two rotational speeds and two different directions of rotation is used, an additional step-down transmission can be used for one direction of rotation in order to obtain approximately equal rotational speeds for an adjustment mechanism, if this should be necessary for the particular application.

It is also possible to operate an adjustment motor intermittently, because brief operations can achieve precise blade positions.

According to another modification of the present invention, the side of the rotor which points towards the rotation axis is designed as the internally geared wheel of a planetary gear transmission. In this way, the hollow flange in a certain sense would perform the function of a planetary gear transmission for the intermediate wheels mounted within it. The so-called sun gear of a planetary gear transmission would then be mounted between the individual planetary wheels. Depending on the desired step-up or step-down ratios, conventional construction forms of single-speed or multiple-speed gear transmissions can be affixed within the hollow flange.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENTLY PREFERRED EXEMPLARY EMBODIMENTS

Figure 1:
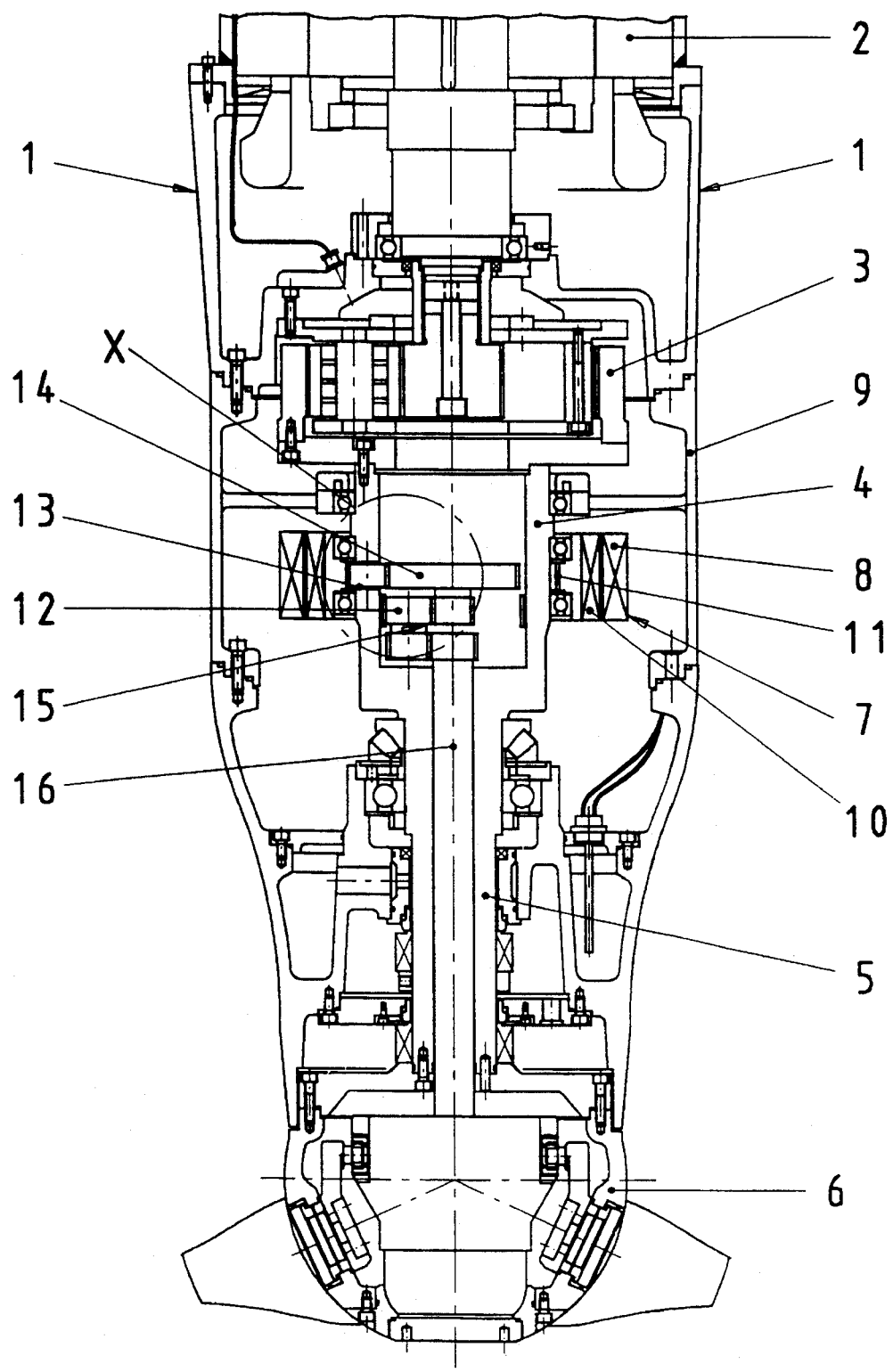
FIG. 1 shows a cross-section of a turbo-engine having an adjustment device through a step-down gear.

Referring now to FIG. 1, a submersible motor-driven pump unit is shown as an example in the form of a turbo-engine 1. A high-speed motor 2 is followed by a step-down gear transmission 3. A shaft 5 is coupled to the gear transmission 3 by means of a hollow flange 4, with a variable-pitch propeller 6 being fastened to the shaft 5. An adjustment spindle 16 is disposed inside the shaft 5. The adjustment spindle conducts adjustment forces to an adjustment mechanism (not shown) inside the variable-pitch propeller 6.

The hollow flange 4, which is shown as part of the shaft 5, can just as well be designed as a part of the step-down transmission 3, as a part of the shaft of the motor 2, or as another part of the shaft. The outer circumference of the hollow flange 4 is surrounded by an electric motor 7, whose stator 8 is fastened rigidly inside the housing part 9 and whose annular rotor 10 is rotatably mounted on the hollow flange 4. The inside diameter of the rotor 10 has a tooth formation 11 suited to transmit torque. In place of the teeth, which are shown here only by way of example, other well-known and conventional designs for transmitting force can be used. A smaller intermediate wheel 12 engages the presently chosen teeth of the formation 11. The intermediate wheel is mounted on recesses 13 of the hollow flange 4. Depending on the type of gear transmission disposed inside the hollow flange 4, one or more intermediate wheels 12 can be mounted in the hollow flange 4. Roll- or ball-shaped machine parts can also take over the function of an intermediate wheel. In the illustrated embodiment, the planetary gear transmission is shown by way of example, such that a sun wheel 14 is mounted within the intermediate wheels 12, which in this case can also be designated as planetary wheels. The adjustment spindle 16 is driven by the sun wheel 14, through another transmission stage 15, which is mounted inside the hollow flange 4. The adjustment spindle 16 interacts with an adjustment mechanism of the adjustment propeller 6.

Figure 2:
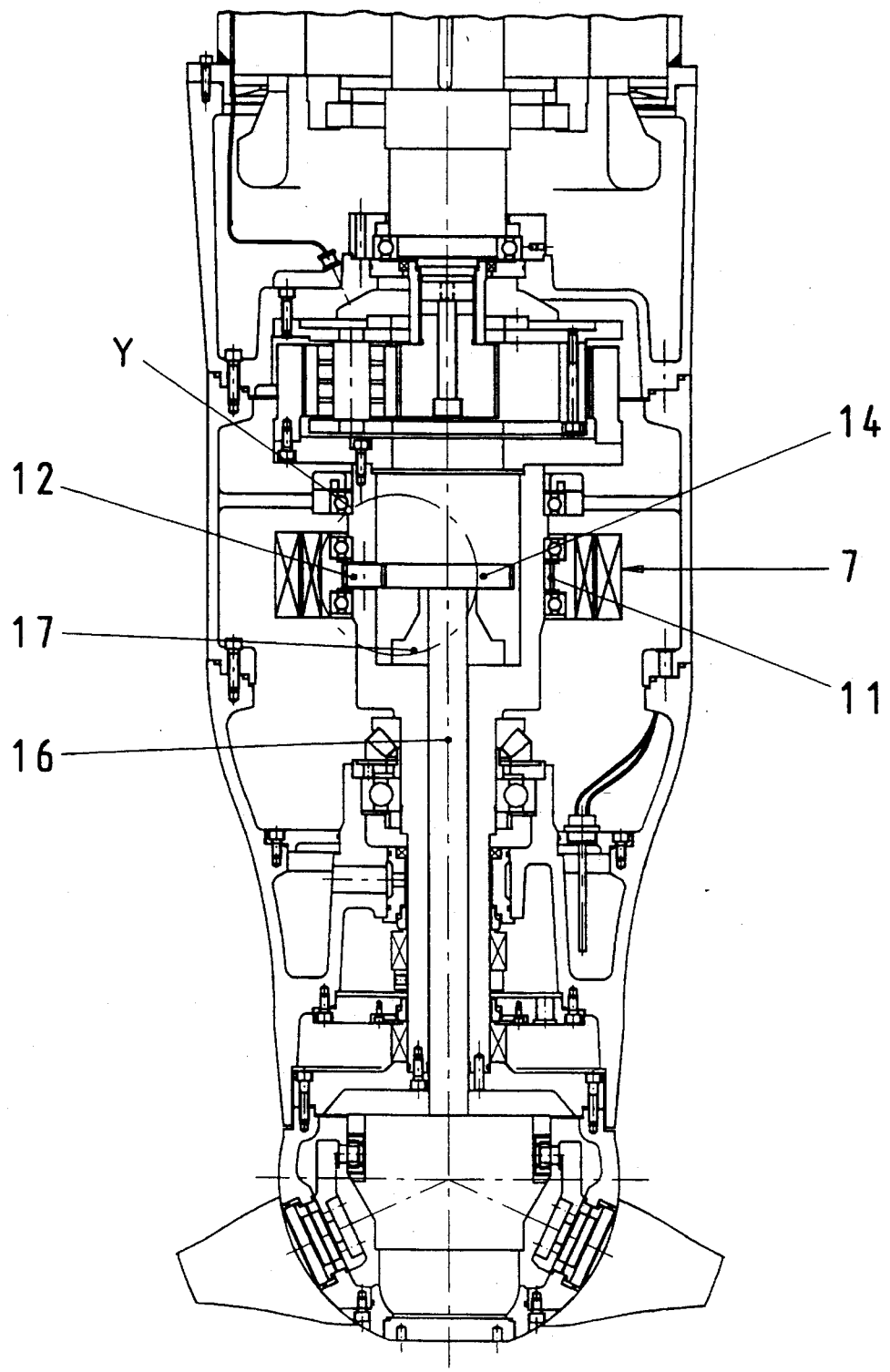
FIG. 2 shows an adjustment device with a quasi-direct drive for the turbo-engine.

The embodiment of FIG. 2 differs from that of FIG. 1 by the drive of the adjustment spindle. The electric motor 7 drives the adjustment spindle 16 almost directly. Only the different ratios between the rotor 10, the intermediate wheel 12, and the wheel 14 which drives the adjustment spindle 16 provide a slight step-down ratio. A bearing 17 inside the hollow flange 4 assures that the adjustment spindle 16 will be positioned securely.

To ensure that an adjustment can also be made during operation, the electric motor 7, which is responsible for the adjustment, can have a variety of operating steps. Motor 7 can be slowed down and/or it can have a rotational speed that is higher than the rotational speed of the shaft 5. It thus has an overtaking motion relative to the shaft. The relative speeds of the adjustment spindle can be produced instantly and through the braking action of the motor. However, the motor also can have various rotational speeds which are faster or slower than the rotational speed of the shaft. Alternatively, the direction of rotation or the rotational speed can be changed by means of the gear transmission disposed within the hollow flange.

Figure 3:
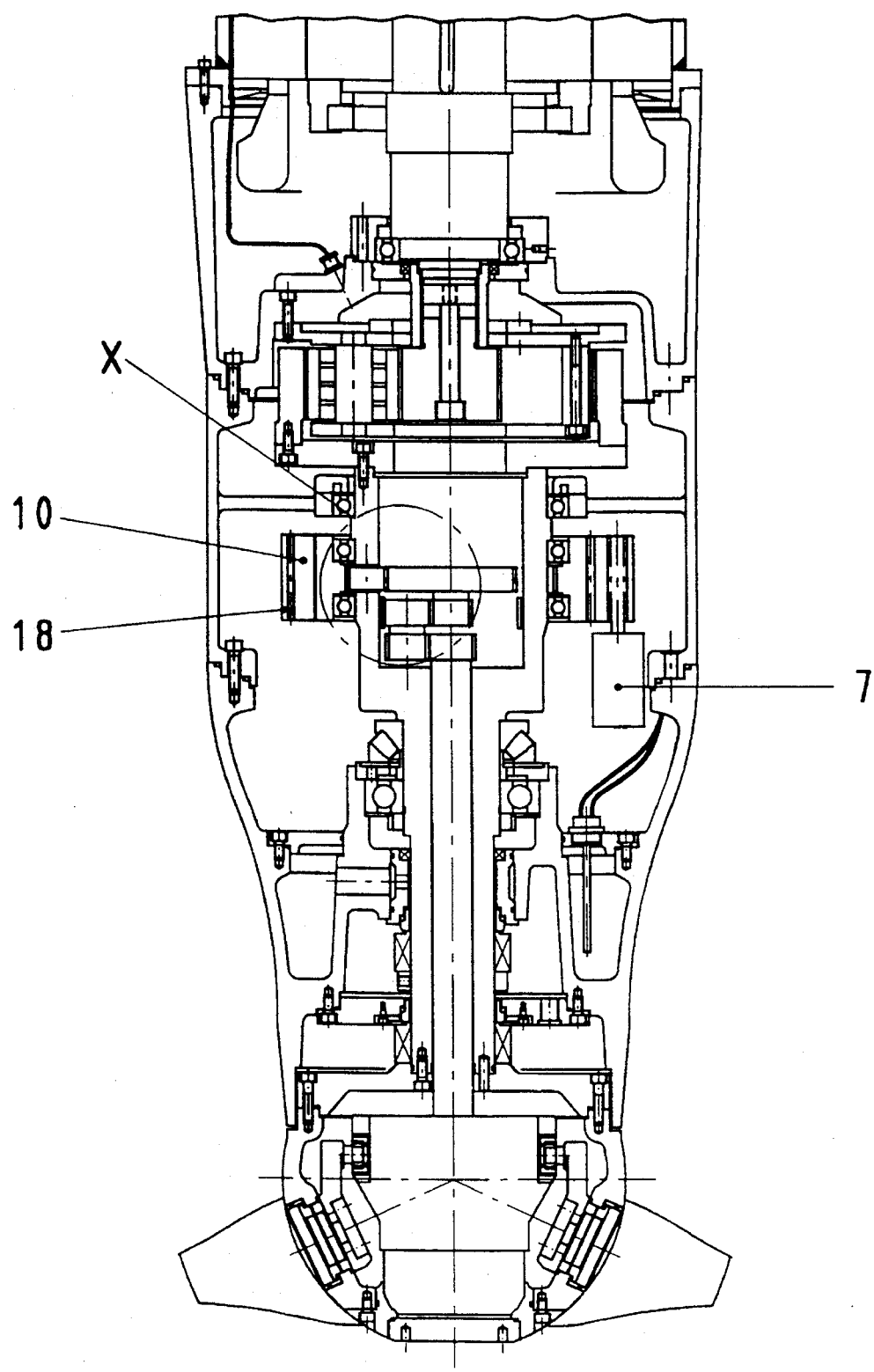
FIG. 3 shows another embodiment of the present invention for conducting force to the adjustment device.
Figure 4:
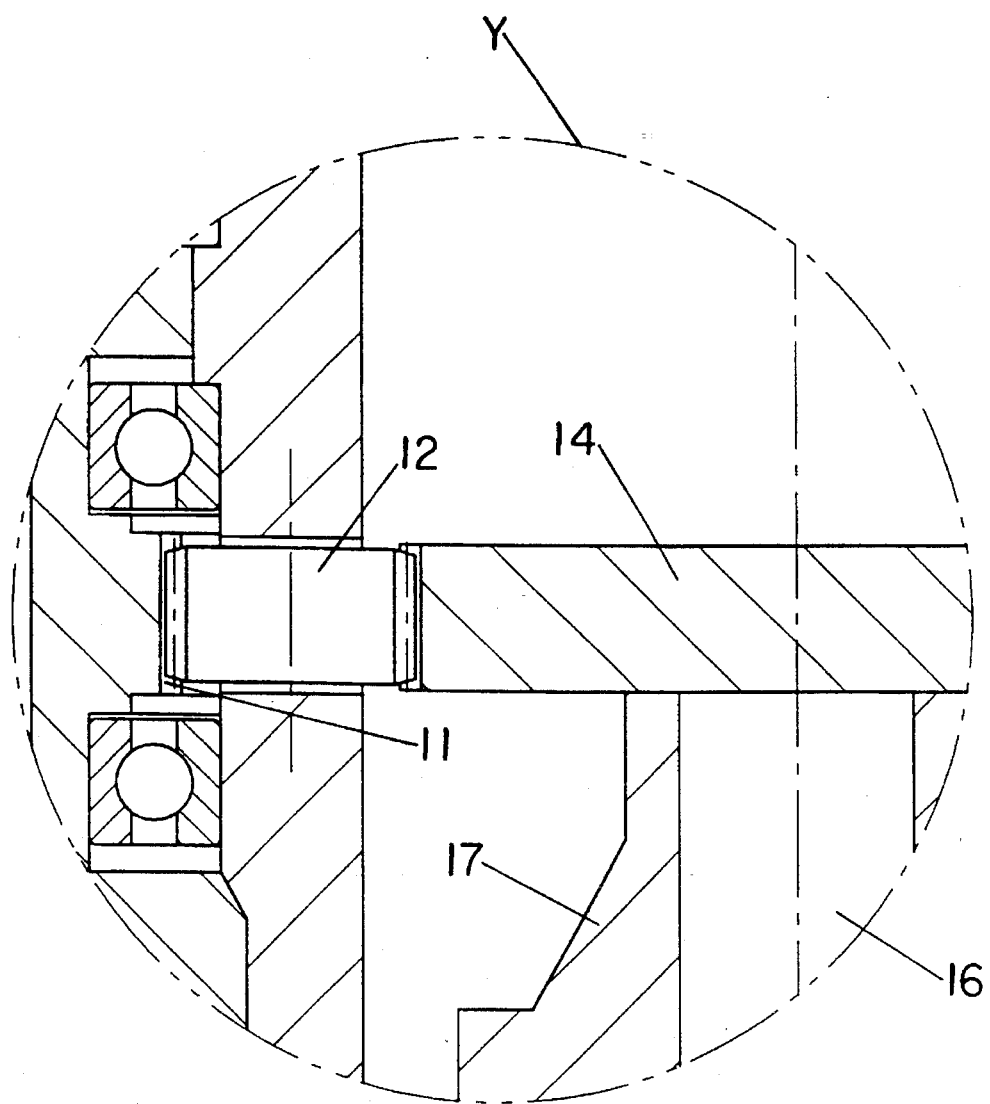
FIG. 4 shows, on an enlarged scale, the portion designated by circle X in FIGS. 1 and 3.
Figure 5:
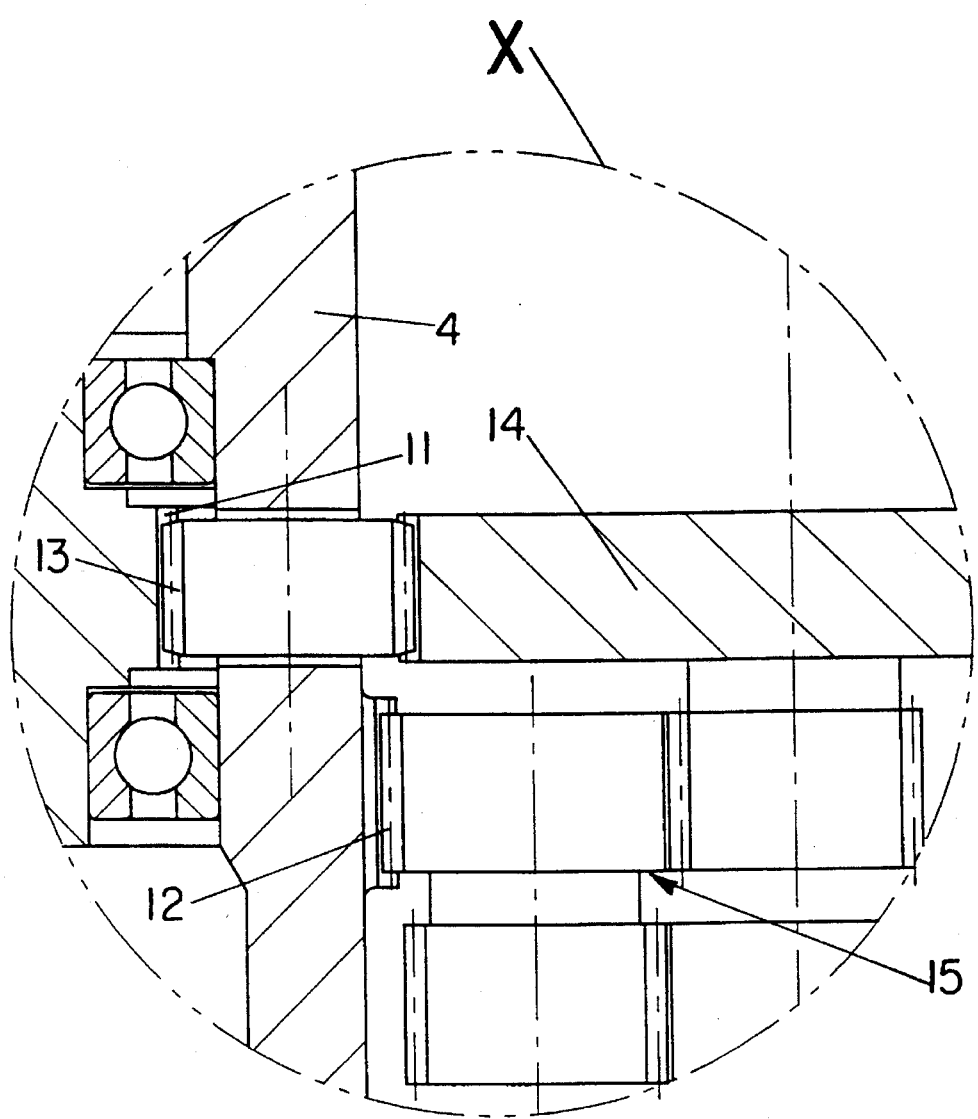
FIG. 5 shows, on an enlarged scale, the portion designated by circle Y in FIG. 2.

FIG. 3 shows another type of rotor drive. The rotor 10 is designed as a structural part whose outside is acted upon by a force. This can be done, for example, by a belt-, chain-, friction wheel-, gear wheel-drive, or the like. The illustrated transmission element 18 is a toothed belt which transmits the force from an electric motor 7 to the rotor 10.

From the foregoing description, it will be appreciated that the present invention makes available, a compact, cost efficient adjacent device for a variable-pitch propeller.

Having described the presently preferred exemplary embodiment of a new and improved adjustment device in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What is claimed is:

1. An adjustment device for adjusting a pitch angle of at least one blade of a variable-pitch propeller of a turbo-engine comprising:

a shaft having a hollow range;

a gear transmission being disposed within said hollow flange;

a propeller being fastened on the shaft; and an annular rotary member having a rotational axis is mounted on and is disposed radially outside of the hollow flange, the rotary member has an inner cylindrical surface facing the rotation axis that has a formation for transmitting torque, the formation is connected to said gear transmission so as to transmit force, and said rotary member being driven by a stator.

2. The adjustment device of claim 1, wherein the rotary member is a rotor of an electric motor.

3. The adjustment device of claim 1, wherein said rotary member outer cylindrical surface, facing away frown the rotation axis, has a second formation which engages a plurality of gear elements, and said rotary member is driven by an electric motor through the gear elements.

4. The adjustment device of claim 3, wherein at least one intermediate wheel is rotatably mounted in a recess of the hollow flange.

5. The adjustment device of claim 1, wherein the inner cylindrical surface of the rotary member is an internally geared wheel of a planetary gear transmission.

6. The adjustment device of claim 1, wherein the hollow flange is integrally connected to said shaft.

* * * * *